Nov. 15, 1955   A. E. BLOMQUIST   2,723,811
AIRPLANE WING SERVICING ENCLOSURE
Filed May 6, 1952   5 Sheets-Sheet 4

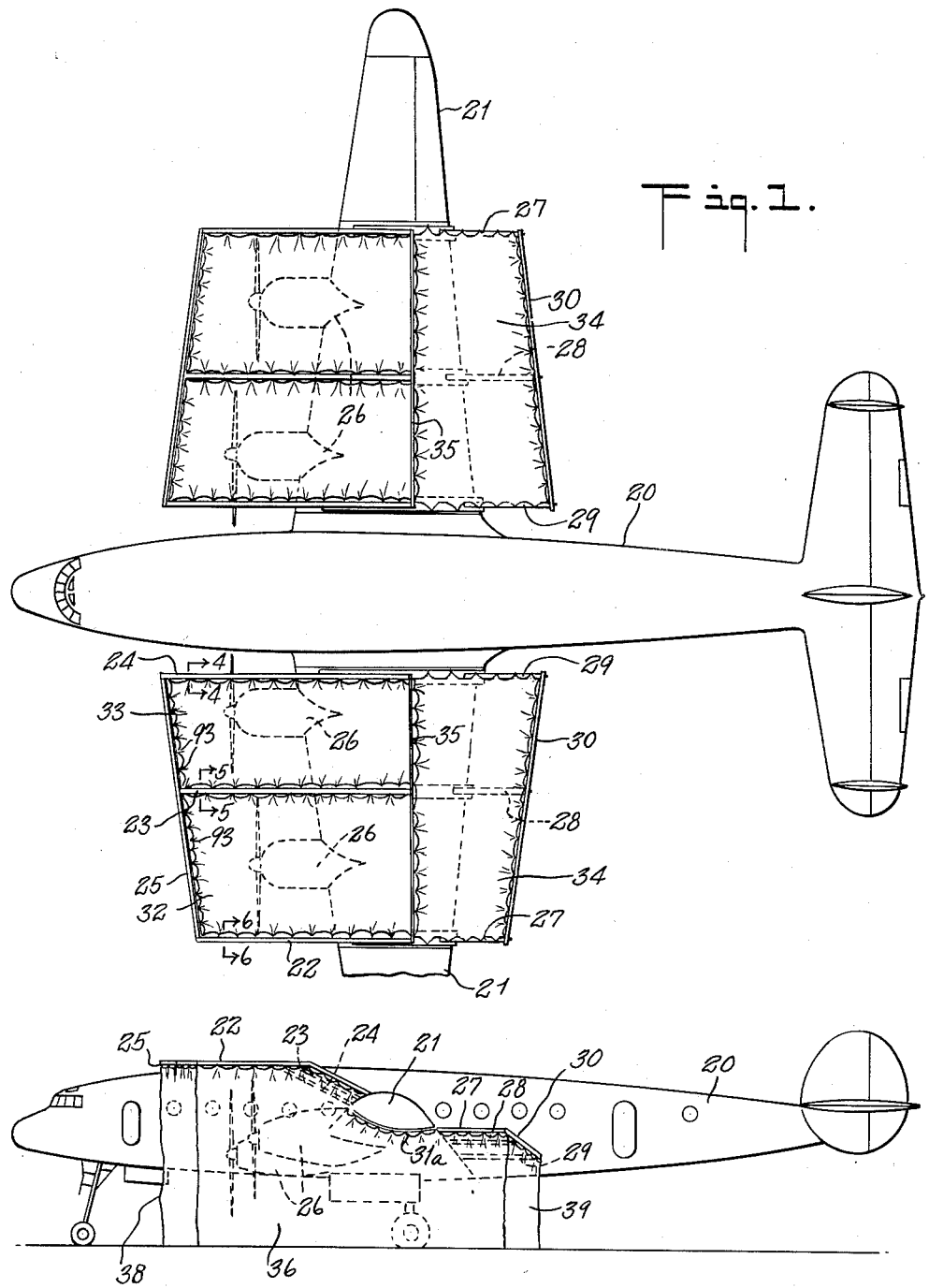

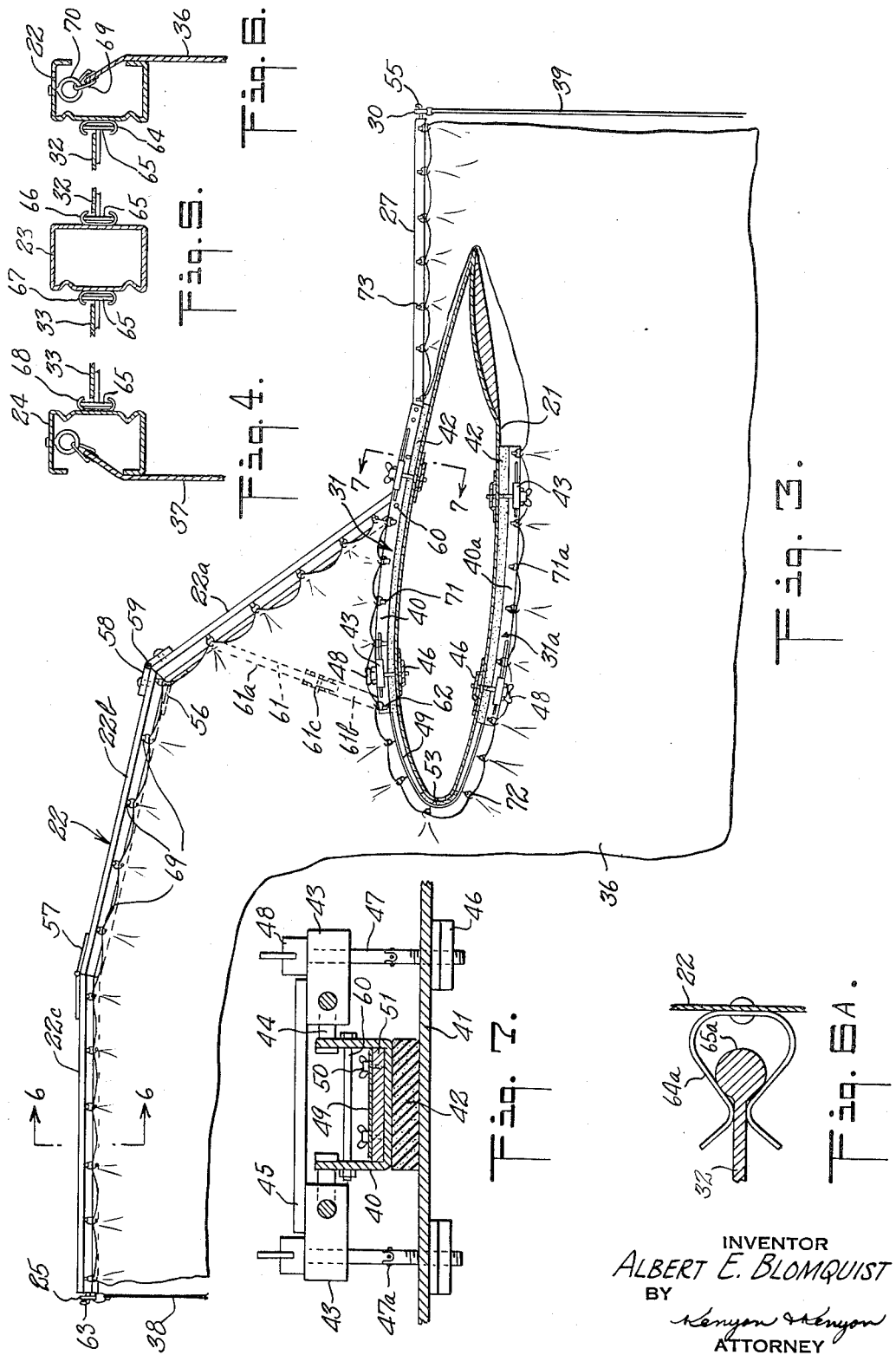

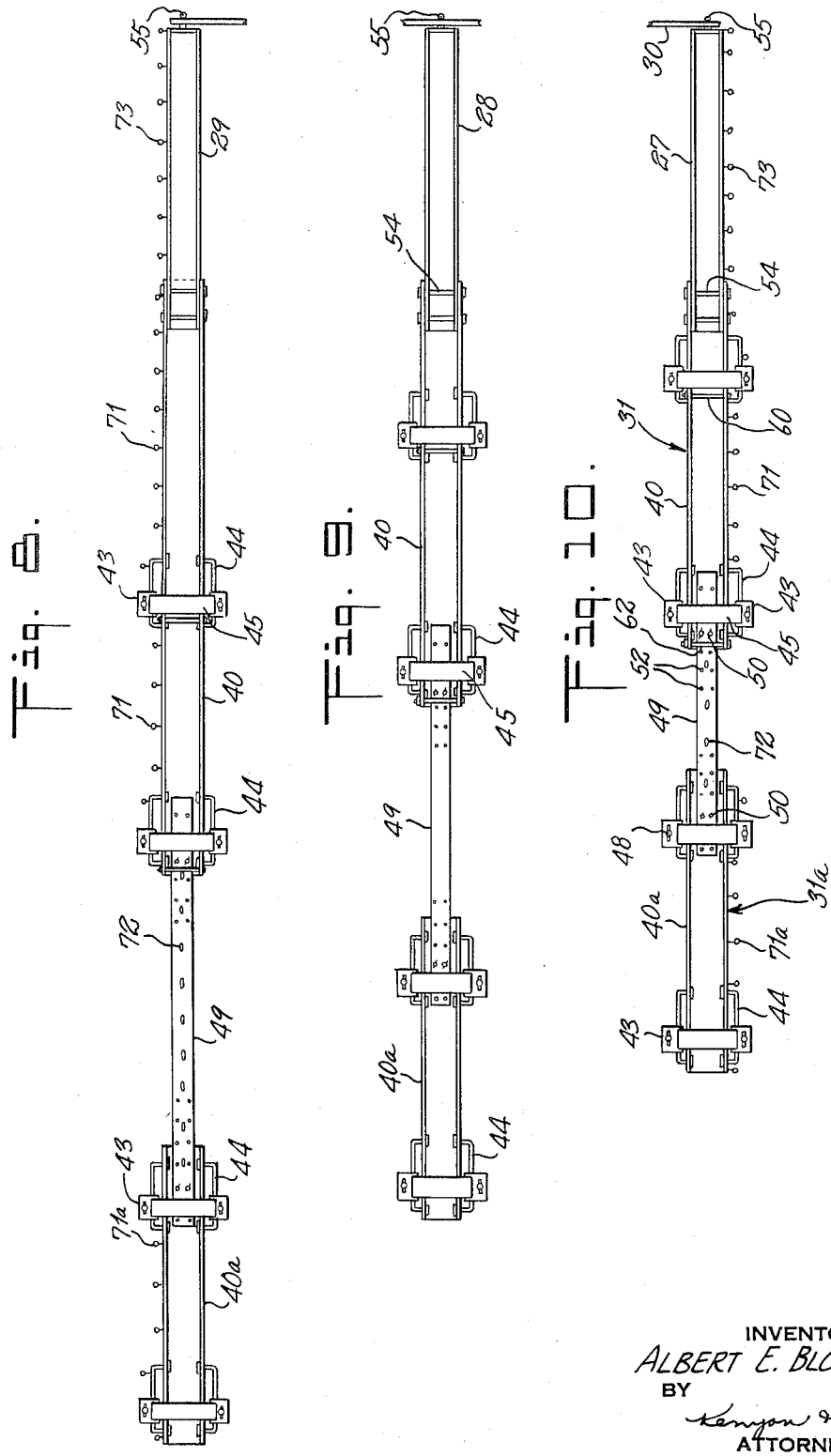

INVENTOR
ALBERT E. BLOMQUIST
BY
Kenyon & Kenyon
ATTORNEY

Nov. 15, 1955    A. E. BLOMQUIST    2,723,811
AIRPLANE WING SERVICING ENCLOSURE
Filed May 6, 1952    5 Sheets-Sheet 5
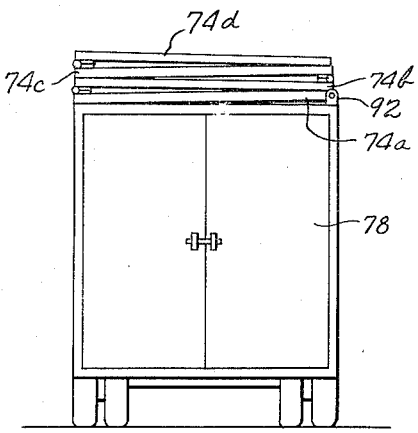
Fig. 13.
Fig. 14.
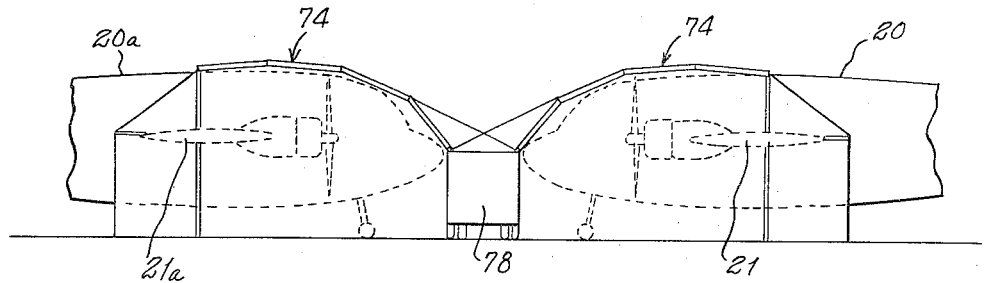
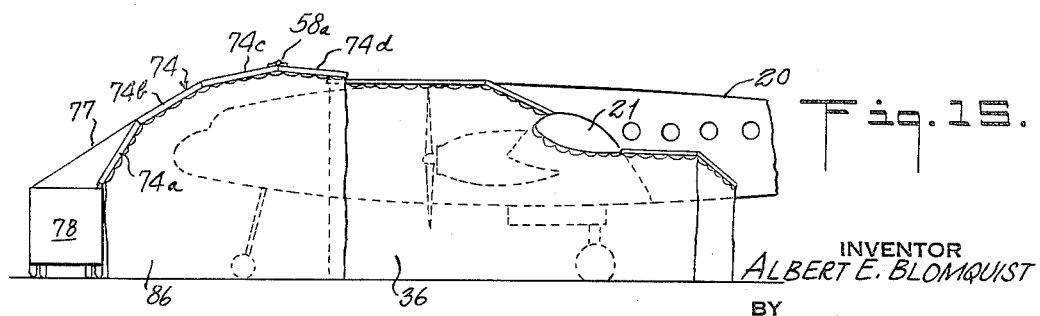
Fig. 15.
INVENTOR
ALBERT E. BLOMQUIST
BY
Kenyon & Kenyon
ATTORNEY

United States Patent Office 2,723,811
Patented Nov. 15, 1955

2,723,811

AIRPLANE WING SERVICING ENCLOSURE

Albert E. Blomquist, Ringoes, N. J.

Application May 6, 1952, Serial No. 286,387

26 Claims. (Cl. 244—1)

This invention relates to servicing enclosures and relates particularly to a readily installable servicing enclosure adapted for servicing an airplane and more particularly a wing portion of an airplane.

From time to time during the life of an airplane it is necessary or desirable to perform certain services on parts thereof such as engines and it is frequently desirable to do so without dismounting the parts in question. Such servicing of an airplane can, of course, be conveniently accomplished when the airplane is taken into a permanent hanger building at an airport. However, especially for large transport planes, a permanent hanger building of adequate size costs hundreds of thousands of dollars or even sums going into the millions. Because of such high building costs as well as the value of the land occupied, the hangar space provided by permanent buildings generally is inadequate for servicing needs. Moreover, it is frequently desirable to service an airplane where a suitable hangar building is not available. For these reasons there has long existed a need for providing a practical means for enabling service, repairs or the like to be performed on an airplane without utilizing a permanent hangar building adapted to house the airplane but in such a way as to provide good protection from the elements for both the workmen and the airplane parts requiring servicing.

Heretofore it has been proposed to provide tent-like structures of various kinds which can be used instead of a permanent hangar building. However, the bulkiness of such tent-like structures and the inconvenience incident to their use has been such that there has been little resort to servicing enclosures of the tent-like type.

It is an object of this invention to provide a servicing enclosure for servicing an airplane which affords adequate protection from the weather for both the workmen and the parts requiring servicing and which is of such character that the servicing enclosure can be readily installed and assembled for use in a very short time even under adverse circumstances. If desired a servicing enclosure embodying this invention can be carried by the airplane itself inasmuch as the enclosure is of such character that its frame members, enclosure walls and roof not only are light in weight but also can be reduced to a compact condition when not in use. Such advantages are likewise apparent if the elements of the servicing enclosure are carried in some other way as by using an ordinary vehicle such as a truck, and in such case the servicing enclosure can be put into use wherever a vehicle can be driven. For use at an airport or the like the servicing enclosure of this invention is ordinarily kept at the airport and is taken out to whatever location may be convenient using a vehicle such as a truck. However, in connection with military or other operations it may become desirable or necessary to perform service on an airplane at a remote point such as some place in the arctic and in a location where a truck or other vehicle is not available; and under such circumstances it is an advantage of the servicing enclosure of this invention that it can, as aforesaid, be carried by the airplane itself during flight and quickly installed and put into use under emergency conditions. The servicing enclosure of this invention is adapted to protect workmen and the airplane parts requiring servicing so that complete line servicing may be performed including the servicing of the engine or engines, the electric system, the hydraulic system, the instrument and control systems, the fuel system, the landing gear, etc., for the servicing enclosure is adapted to afford the desired protection along the exterior of the wings of an airplane while other parts within the fuselage are afforded protection by the fuselage itself.

It is one of the features of the servicing enclosure of this invention that it utilizes the wing of the airplane itself in combination with wing contour pads from which other structural elements of the enclosure extend. At least two wing contour pads are disposed transversely of the wing in suitably spaced relation as for example adjacent each side of an engine mounted in the wing. The wing contour pad means extends along at least the upper surface of the wing, and preferably the wing contour pad means is such that there is a wing contour pad disposed transversely of the wing along not only the upper surface thereof but also along the under surface thereof. The wing contour pads can be held in position by any suitable means such as the means exemplified hereinbelow in connection with certain illustrated embodiments of this invention.

According to further features of this invention frame members extend from the wing contour pads substantially beyond one and preferably both margins of the wing with portions thereof in the region of at least one of the margins of the wing at a substantially greater elevation than the top of the wing. These principal frame members may be secured to the wing contour pads in such a way as to require no other support for maintaining them in their laterally extending position as aforesaid. Alternatively the remote ends of the frame members may be supported by a portable support and according to one of the embodiments of the invention such a portable support may be provided by the body of a vehicle such as a truck which has been positioned in front of the airplane engine for supporting the extremities of the frame members. In such case the frame members may be carried by the roof of the truck, and the truck body will not only provide a wall for the enclosure but also a source for supplying tools and equipment, and under certain circumstances heat, so as to be available within the immediate interior of the enclosure. For convenience in transportation and storage when not in use the frame members are preferably composed of a plurality of sections which are articulated by means of hinges or the like so that the sections of the frame members can be folded on themselves.

Further features of this invention relate to the means affording the roof and side walls of the enclosure and their relationship to the principal frame members and the wing contour pads. Thus, according to the preferred practice of this invention flexible sheet material such as weather resistant or weather proof tent cloth, plastic sheet material or the like extends between the frame members after they have been installed and the opposite margins of the flexible sheet material are held in place by fastening or securing means disposed therealong which is slidable longitudinally of the principal frame members so that the flexible sheet material constituting the roof of the enclosure can be fed onto the frame members from one end thereof, the slidable securing means permitting the sheet material to be advanced until the sheet material extends to the other extremity of the principal frame members thus providing roof coverage extending between the frame members throughout their length.

Further features of this invention relate to the enclosing walls of the enclosure including side walls which are dependent from the frame elements and which are adapted to accommodate the passage of the wing therethrough. The side walls of the enclosure are in the form of curtains of flexible sheet material and preferably these curtains are not only attached to the frame members extending from the wing contour pads but also are attached to the wing contour pads both along the upper surface of the wing and along the under surface of the wing.

Preferably the enclosure comprises bar members which extend rearwardly, that is in the direction opposite to the extent of the principal frame members which project beyond the forward margin of the wing, so that curtains comprised in the enclosure walls will clear the rear margin of the wing.

Other features of this invention relate to the construction of the wing contour pads and of the frame members and to the mounting of the wing contour pads so as to be maintained in position as transversely disposed with respect to the wing.

Further objects, features and advantages of this invention will be apparent in connection with the following description of certain typical embodiments of this invention which are shown for purposes of exemplification in the accompanying drawings wherein Fig. 1 is a plan view of an airplane having one embodiment of the servicing enclosure of this invention mounted on the wings thereof;

Fig. 2 is a side view of the airplane and servicing enclosure shown in Fig. 1;

Fig. 3 is a side elevation on a larger scale of the wing contour pads, frame members and dependent curtains constituting the side of the enclosure shown in Fig. 2 which is closest to the observer;

Fig. 4 is a section through one of the frame members taken on the line 4—4 of Fig. 1 and on a larger scale;

Fig. 5 is a similar section of the center frame member on the line 5—5 of Fig. 1;

Fig. 6 is a similar section taken on the line 6—6 of both Fig. 1 and Fig. 3;

Fig. 6A is detail section on a somewhat larger scale showing alternative securing means for securing the sheet material to a frame member, the securing means illustrated being substituted for the securing means shown in Fig. 6;

Fig. 7 is a section on a larger scale of the wing contour pad shown in Fig. 3 taken on the line 7—7 of Fig. 3;

Figs. 8, 9 and 10 show in plan form, and on a relatively large scale, the wing contour pads for the enclosure shown in Figs. 1 and 2, the wing contour pad shown in Fig. 10 being the wing contour pad shown in side elevation in Fig. 3;

Fig. 13 is an end view of the vehicle shown in Figs. 11 and 12 with the principal frame members of the enclosure having the sections thereof folded on top of the vehicle;

Figure 11:
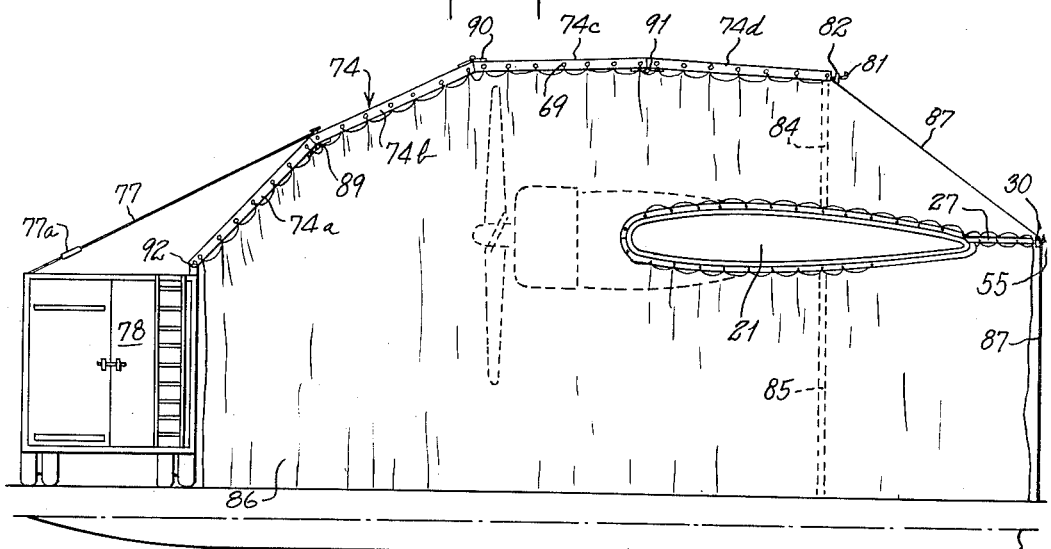
Fig. 11 is a side elevation of an alternative embodiment of this invention wherein one end of each of the principal frame members is supported by and attached to a vehicle.

Fig. 14 is a side elevation largely schematic which illustrates the provision of two servicing enclosures for the engines of two airplanes, both of the servicing enclosures being supported in part by a single vehicle; and Fig. 15 is a side elevation largely schematic which illustrates the provision of a servicing enclosure according to this invention having one portion thereof supported entirely by an airplane wing and another portion thereof supported by a vehicle such as a truck.

The embodiment of this invention shown in Figs. 1 to 10 will be first described. The servicing enclosure of this embodiment is such that all of the frame elements to which the roof and enclosing side walls are attached are supported entirely by the airplane wing. The servicing enclosure can be readily installed and removed from the airplane wing; and when installed the enclosure provides effective protection from the elements. When it is removed the various elements thereof are such that they can be stored in a small space so that, if necessary, the complete equipment can be carried in the airplane itself; and the lightness of the elements of the enclosure contributes to its suitability for such use. For like reasons, the enclosure is such as to be well suited for providing servicing equipment kept at an airport since the different elements thereof, when removed from the airplane wing can be stored, handled and set up very readily.

Figs. 1 and 2 show the general appearance of the enclosure when installed on an airplane wing. For purposes of illustrating typical use of the enclosure it has been shown in position for servicing the engines of an airplane as well as other airplane parts in the region of the wing where the engines are located. The basic elements of the enclosure which are shown in combination with the lower wing of Fig. 1 and also shown in Fig. 2 will be described hereinbelow. The enclosure which is shown in connection with the upper wing of Fig. 1 is the complement of that shown in combination with the lower wing.

While the enclosure is adapted for use in connection with any type of airplane a typical airplane is shown in Figs. 1 and 2 having the fuselage 20 from which the wings 21 extend having the engines 26 mounted thereon. The enclosure which is secured to and carried by the wings 21 comprises the principal frame members 22, 23 and 24. These frame members are secured to and carried by the wing contour pads as shown and illustrated more in detail in Fig. 3 which will be described below. It is to be noted that these frame members extend laterally from adjacent the upper surface of the wing substantially beyond the forward margin of the wing and beyond the outermost extremity of the engine with the portions thereof in the region of the engine at a substantially greater elevation than the top of the wing and also the top of the engine. The extremities of these frame members are joined by the spacer bar 25 which is attached thereto in readily removable relation that will be referred to in further detail hereinbelow. Extending rearwardly there are the bar members 27, 28 and 29 which extend from adjacent the top surface of the wing rearwardly substantially beyond the edge of the wing that is opposite the edge in which the engines are mounted. The rearmost extremities of these bar members are joined by the spacer bar 30.

The foregoing are the principal frame elements for holding the roof and enclosing walls of the enclosure. A sheet 32 of flexible sheet material made of any suitable material for providing resistance to the elements is disposed between the frame members 22 and 23 and another similar sheet 33 is disposed between frame members 23 and 24. The sheets 32 and 33 are secured to the frame members between which they extend substantially throughout their length and provide a roof for this portion of the enclosure. Another sheet 34 of flexible sheet material, which is disposed so as to extend between the bar members 27 and 29 and overlies and is supported by the bar member 28, provides the roof for this portion of the enclosure. Preferred means for attachment of the sheets 32, 33 and 34 will be described more in detail hereinbelow.

Depending from the frame member 22 and the bar member 27 is a curtain 36 which extends from these frame elements down to the ground surface. This side curtain is apertured so as to accommodate the passage of the wing 21 therethrough and is attached to and partially supported by the wing contour pads 31 and 31a disposed along the upper and under sides respectively of the wing as shown and described more in detail in connection with Fig. 3. A corresponding side curtain 37 is similarly formed and dependent from the frame member 24 and from the bar member 29 so as to provide the side wall for the opposite side of the enclosure. The enclosure wall in front of the engine is provided by a front curtain 38 which is secured to and dependent from the spacer bar 25. Similarly the rear wall enclosure is provided by a curtain 39 which is secured to and dependent from the spacer bar 30.

The foregoing illustrates generally how the enclosure of this invention provides a roof and four enclosure walls which afford effective protection from the weather for both the parts to be serviced and workmen. While the frame elements are simple and of relatively small size, and while the frame elements are entirely supported from the wing of the airplane, nevertheless the enclosure which is provided is not only effective, but also provides ample working space for permitting the servicing of the engines and other parts mounted on the airplane wing.

The nature of the enclosure which has been described generally in connection with Figs. 1 and 2 will be described more in detail as regards the elements thereof in connection with Figs. 3 to 10. The wing contour pads are shown in Figs. 3, 7, 8, 9 and 10. While three wing contour pads are shown in Figs. 8, 9 and 10 respectively the parts thereof are identical except for the longitudinal extent of some of them for accommodation to differences in the transverse extent of the airplane wing at the respective stations where the wing contour pads are secured to the airplane wing. Thus, the wing contour pad shown in Fig. 10 is that which carries the frame member 22 as shown in Figs. 1, 2 and 3. The wing contour pad shown in Fig. 9 is that which supports the frame member 23 shown in Figs. 1 and 2 and the wing contour pad shown in Fig. 8 is that which supports the frame member 24 shown in Figs. 1 and 2. Since the parts are identical except for the longitudinal dimension of some of them, the wing contour pad which is shown in Fig. 10, as supplemented by the showing in Figs. 3 and 7, will be described in detail, and the same description is also applicable to the wing contour pads shown in Figs. 8 and 9.

For disposition transversely along the upper surface of the airplane wing 21 there is the wing contour pad indicated generally by the reference character 31 which comprises a U-shaped channel bar 40 disposed with the flat bottom portion thereof adjacent the surface 41 of the airplane wing 21 with a strip 42 of suitable padding material such as sponge rubber interposed between the skin of the airplane wing and the channel bar 40. The channel bar 40 may be clamped into place by suitable clamping means. According to the embodiment shown the clamping means consists of the blocks 43 through which pass the rods 44 that are secured at each end to the side walls of the channel bar 40. The blocks 43 are slidable with reference to the rods 44 through a limited extent of movement relative to the longitudinal extent of the channel bar 40 so as to permit adjustment of the position of the blocks 43. The blocks 43 are secured together by any suitable means such as welding to a cross bar 45. Embedded in and attached to the surface of the airplane wing are suitable members 46 which are adapted to receive in threaded engagement the threaded ends of the bolts 47 which pass through the blocks 43 and terminate in the wing ends 48. When the blocks 43 have been moved to position for registration of the bolts 47 with the members 46 adapted to receive them, the bolts 47 may be tightened so as to clamp the channel bar 40 firmly against the wing of the airplane. To facilitate initial registration of the threaded ends of the bolts 47 with the member 46, the bolts 47 comprise universal joints 47a between block 43 and the threaded ends thereof.

For disposition transversely along the under surface of the airplane wing there is the similar wing contour pad which is indicated generally by the reference character 31a and which comprises the channel bar 40a. The clamping means above described is utilized for clamping the channel bar 40a against the under surface of the airplane wing. In order to provide continuity between the channel bar 40, which is clamped to the upper surface of the airplane wing, and the channel bar 40a, which is clamped to the under surface of the airplane wing, a strap 49 is preferably employed. The strap 49 may be attached to the channel bar 40 by means of the wing headed bolts 50 which pass through holes in the strap 49 and which are adapted for threaded engagement with the bottom of the channel bar 40. Preferably a layer of suitable padding 51 such as sponge rubber is disposed between the strap 49 and the bottom of the channel bar 40. In order that the strap may be conveniently adjusted so as to facilitate accommodation to different wing sizes and to different locations along a tapered airplane wing the strap is preferably provided with suitable holes 52 for passage of the wing headed bolts 50 therethrough at a plurality of points at conveniently located intervals. In the manner described the strap 49 can be secured to the upper channel bar 40 and to the lower channel bar 40a so as to follow relatively closely the contour of the forward edge of the airplane wing. The strap can be prevented from contacting the forward edge of the airplane wing by the use of a suitable padding 53 such as sponge rubber. The strap 49 is attached to the channel bar 40a in the manner above described as regards its attachment to the channel bar 40.

The bar members 27, 28 and 29 which extend rearwardly are attached to the channel bar 40 of each of the wing contour pads as clearly shown in Figs. 3, 8, 9 and 10. Each of the bar members 27, 28 and 29 is a U-shaped channel bar and is similar to the channel bar 40 except that its exterior is adapted to fit within the interior surface of the channel bar 40 and is secured thereto by the bolts 54 which pass through the side walls of these channel members where their ends interfit.

At the extremity of each of the bar members 27, 28 and 29 is a hook 55 which is adapted to hold the spacer bar 30. The spacer bar 30 is provided with three apertures which are adapted, respectively, to fit over the hook 55 at the end of each of the bar members 27, 28 and 29 so that the spacer bar 30 can be readily removed and, when attached, will maintain the extremities of the bar members 27, 28 and 29 at proper spacing and will likewise provide support for the curtain 39 which constitutes the rear enclosure wall of the enclosure. Preferably the spacer bar 30 is segmented rather than continuous for convenience in storage when the enclosure is disassembled. Thus one segment may extend between and be hooked onto bars 27 and 28 and a second segment may extend between and be hooked onto bars 28 and 29.

The construction detail of the principal frame members 22, 23 and 24 is shown especially in Figs. 3, 4, 5 and 6. Referring to Fig. 3 the frame member which is indicated generally by the reference character 22 consists of three sections 22a, 22b and 22c, each of which has the cross section shown in Fig. 6. The sections 22a and 22b are joined by the hinge 56 and the sections 22b and 22c are joined by the hinge 57. It is thus seen that the frame member 22 is composed of articulated sections of approximately the same length which can be folded on each other when the servicing enclosure is removed from the airplane wing. In order to maintain the sections 22b and 22c in the extended position shown a separable locking hinge 58 is provided having opposite ends which are rigidly secured respectively to the sections 22 and 22b and which can be secured together in locked position by inserting the removable pintle 59. The lower end of the section 22b is attached to the channel bar 40 of the wing contour pad 31 by inserting the lower end thereof within the channel bar 40 and passing the bolt 60 through holes in the opposite side walls of the channel bar 40 and through corresponding holes in side walls of the section 22a adjacent the end thereof which is inserted between the side walls of the channel bar 40. For maintaining the section 22a at the desired inclination a strut member 61 is provided the lower end of which is attached to the channel bar 40 by the bolt 62 and the upper end of which is secured to the section 22a by any suitable means (not shown) such as a bolt or pin. Preferably the strut member 61 is made so as to be of adjustable length, e. g. in the form of two telescopically interfitting parts 61a and 61b so that the length thereof can be adjusted for establishing the desired angle that the frame element 22a makes with the airplane wing. The parts 61a and 61b may be maintained in desired relative position by any suitable means as by providing a pin 61c adapted to pass through apertures in said parts, at least one of said parts having such apertures disposed therealong at suitable intervals to permit the desired adjustment of the overall length of the strut member 61.

The cross section of the frame member 23 is shown in Fig. 5 and its construction in sections and the means for securing it to the wing contour pad 31 to which it is attached are the same as has been described hereinabove in connection with the frame member 22. Similarly the cross section of the frame 24 is shown in Fig. 4 and this frame member is likewise composed of sections and is secured to its wing contour pad in the manner and by the means above described.

At the outer extremity of each of the frame members 22, 23 and 24 is a hook 63 to which the spacer bar 25 may be detachably secured either in the form of a single bar or segmental bar portions in the manner that has been described hereinabove in connection with the spacer bar 30 which is carried by the hooks 55 at the extremity of each of the bar members 27, 28 and 29.

Generally in connection with the frame elements above described the wing headed bolts and other uniting means are such as to permit ready assembly and disassembly of the parts and it is to be noted that all of the parts when individually considered are relatively short and that when the frame elements have been disassembled it is possible to store them in a relatively small and compact space. Moreover, the various parts can be provided so as to have suitable strength even when made of relatively thin gauge metal which enables the various parts to be manufactured so as to be relatively light weight, thus permitting their being easily handled by workmen during assembly and disassembly. Moreover, the compactness and lightness in weight of the frame elements is an important factor which permits the disassembled frame elements to be readily carried in an airplane if this should be desirable.

The means for securing the flexible sheet material in position for providing a roof for the enclosure and for permitting its ready installation and removal will now be described with particular reference to Figs. 4, 5 and 6. Referring to Fig. 6 the frame member 22 has a track 64 extending longitudinally thereof. This track extends throughout the length of each of the sections 22a, 22b and 22c and the ends of the track where these sections are united register with and abut each other so that they afford a single track extending from one section to the other throughout the length of the frame member 22. The track 64 is adapted to retain a plurality of button elements 65 therein while permitting the sliding of the button elements relatively thereto longitudinally throughout the extent of the track 64. The several button elements 65 are attached at appropriate intervals to the margin of the sheet 32 that is adjacent the track 64. A similar track 66 is attached to the frame member 23 which opposes the track 64 attached to the frame element 22 and the button elements 65 which are attached to the opposite margin of the sheet 32 are slidable longitudinally along the track 66 while being retained within the track 66. When the sheet 32 is thus adapted to be retained by the frame members 22 and 23 in slidable relation therewith the sheet can be put in place by successively feeding the button elements 65 on the opposite margins thereof at the open end of each of the tracks 64 and 66. In the embodiment shown this can be conveniently accomplished at the lower extremity of the frame members 22 and 23 where they are attached to the wing contour pads. By successively feeding the button members into the track and pulling the sheet material outwardly, the sheet material can be quickly inserted and drawn between the tracks until it extends from one end to the other of each of the frame members 22 and 23. To facilitate this operation the end of the sheet material which is initially fed in can have one or more cords attached thereto which can be passed over the spacer bar 25 at the extremity of the frame members 22 and 23 and by merely pulling upon the cord or cords the sheet material can be quickly drawn into place. After this has been done the margin of the sheet 32 adjacent the bar 25 can, if desired, be secured thereto by any suitable means such as hooks 93.

Similarly the sheet material 33 has the button members 65 attached at intervals along the opposite margins thereof and are slidable in the retaining tracks 67 and 68 which are attached respectively to the frame members 23 and 24.

Alternative fastening element and retaining track means are shown in Fig. 6A which, while specifically shown in combination with the frame element 22, may also be utilized in combination with the frame members 23 and 24. According to Fig. 6A the fastening element means attached to the opposite margins of the flexible sheet material 32 is continuously disposed along said margins and in the form shown consists of a marginal enlarged beading 65a. The track 64a shown in Fig. 6A is shaped so as to retain the beading 65a therein while permitting the beading to be fed into an open end of the track 65a and slid longitudinally therealong.

The means for attaching one of the side curtains for the enclosure is clearly shown in Figs. 3, 6 and 10 with reference to the side curtain 36. Along the upper margin of the side curtain 36 there is a plurality of hooks 69 which are adapted to be hooked into the eyes 70 that are attached to the frame member 22 underneath the upper wall thereof. By locating the eyes 70 within the channel bar of the frame member 22 the upper margin of the curtain 36 can be brought into the channel bar so as to provide more effective protection against access of the elements. In the region of the wing 21 the curtain 36 is cut away so as to provide a margin which generally corresponds to the peripheral contour of the wing section. The eyes 71 are attached to the outer side wall of the channel bar 40 of the wing contour pad 31 and similar eyes 71a are correspondingly attached to the channel bar 40a of the wing contour pad 31a which is disposed along the under surface of the wing. Moreover, the eyes 72 are attached to the strap 49 which is disposed about the forward edge of the wing. Additional eyes 73 are attached to the outer wall of the bar member 27. The margins of the side curtain 36 which are adjacent the wing contour pad, the strap 49 and the bar member 27 are provided with suitably spaced hooks for permitting ready atttachment of the side curtain to the wing contour pad along both upper and lower surfaces of the wing and to the eyes secured to the strap 49 and to the bar member 27. In this way a curtain providing a side wall for the enclosure is provided which effectively excludes the elements while accommodating the passage of the airplane wing therethrough. The side curtain 37 providing the other side wall is essentially the same as the side curtain 36 and is attached to the frame member 24, the bar member 29 and the wing contour pad that supports these elements in the same manner that has just been described.

For providing a roof over the portion of the enclosure to the rear at the point where the principal frame members are attached to the wing contour pads the sheet 34 may be provided with hooks at each end thereof for attachment to the eyes 71 and 73 shown in Figs. 8 and 10 that are also used for supporting the side curtains. Hooks can also be provided for attaching the sheet to the spacer bar 30 and the bar 35. Alternatively the sheet 34 may be an integral extension of the sheets 32 and 33.

The curtain 38 for the front of the enclosure may be provided with hooks along the upper margin thereof which are adapted to hook over the spacer bar 25. Similarly the curtain 39 which constitutes the rear wall of the enclosure may be provided with hooks along the upper margin thereof which are adapted for attachment to the spacer bar 30. To keep the curtains providing each of the walls of the enclosure from blowing about any suitable means for holding them in place may be provided such as the provision of a "dead man" at intervals along the bottom of each curtain.

It is apparent from the foregoing that the servicing enclosure which is provided according to this invention not only is light in weight and compact for storage, but also may be very quickly installed. Thus, when, for example, the engine of an airplane requires servicing the wing contour pads can be quickly positioned and secured in place alongside the engine or engines. The principal frame members can then be attached to the wing contour pads using for the purpose a minimum number of bolts which are in the nature of securing pins. After the frame elements have thus been installed all that is required is to hang the curtains therefrom and a commodious and substantial enclosure is afforded which provides good protection both for the engine parts and for the workmen. When the servicing has been completed it is a simple matter to disassemble the parts and remove them from the airplane wing.

The foregoing description has illustrated how the enclosure of this invention may be constructed so as to simultaneously enclose two engines of a four engine airplane. However, it is apparent that the enclosure likewise is suitable for accommodating and servicing only a single engine. When the enclosure is intended for only a single engine the central frame members and associated contour pad, as shown in Figs. 5 and 9, would be omitted and frame members and wing contour pads corresponding to Figs. 4, 6, 8 and 10 would be used alone as disposed on the opposite sides of a single engine. The enclosure also permits, of course, the servicing of any parts other than the engine parts within the enclosure. Moreover, the wing contour pads may, if desired, be located at positions other than those shown in relation to and airplane wing and in relation to the engine or engines of an airplane.

Figure 12:
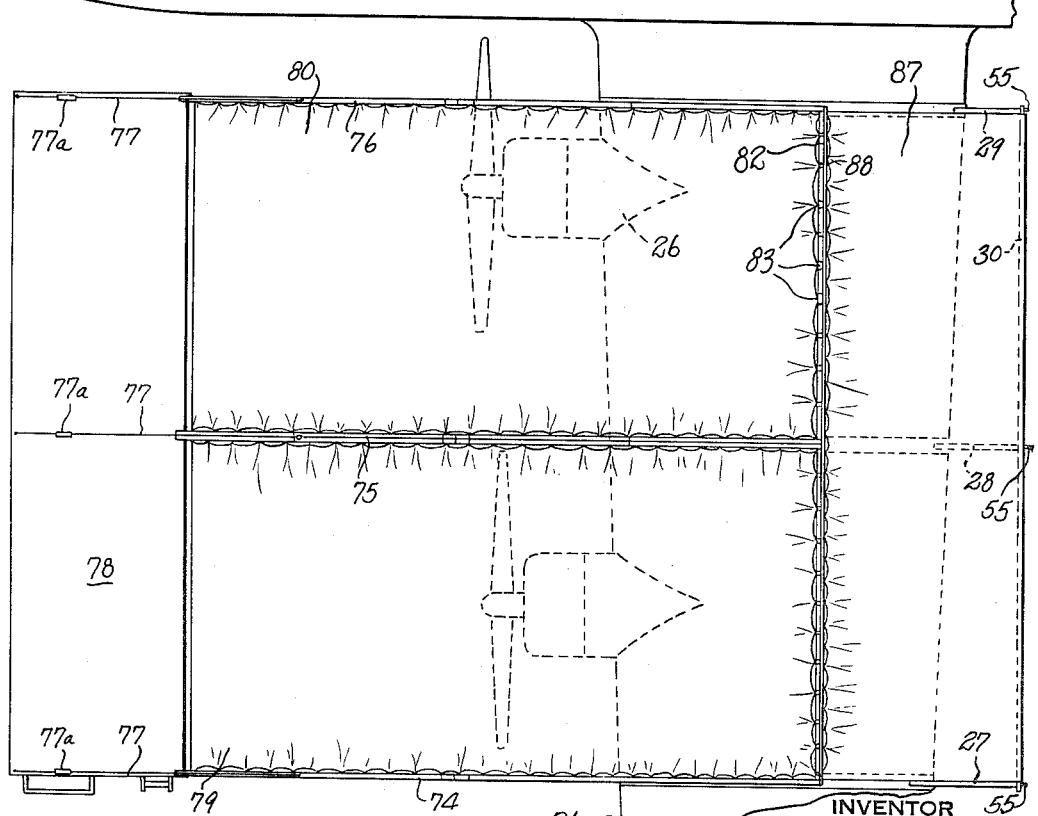
Fig. 12 is a plan view of the enclosure shown in Fig. 11.

An alternative embodiment of this invention is shown in Figs. 11, 12 and 13. According to this embodiment the principal frame members instead of being supported wholly by wing contour pads held in position on the airplane wing are partially supported by a support spaced substantially from one of the wing margins. As shown the support may be spaced substantially from the outer extremity of the engine or engines of the airplane located in the forward margin of the wing. While any suitable support means may be employed it is preferable to employ a portable support in the form of a vehicle such as a truck. According to the illustrative embodiment shown in Figs. 11, 12 and 13, which is adapted for enclosing two engines mounted on an airplane wing, the principal frame members are designated by the reference characters 74, 75 and 76. The frame member 74 is shown as made up of sections 74a, 74b, 74c and 74d. The sections 74a and 74b are joined by the hinge 89. The sections 74b and 74c are joined by the hinge 90 and the sections 74c and 74d are joined by the hinge 91. The frame members 75 and 76 are similarly made up of like sections joined by similarly located hinges. The section 74a of the frame member 74 is pivotally attached to the roof of the truck body 78 by the pins 92 and the corresponding sections of the frame members 75 and 76 are also pivotally attached to the roof of the truck body 78. By thus providing frame members made up of articulated sections the sections can be folded on one another to the position shown in Fig. 13 when not in use so that they can be readily carried as an integral part of the truck. In order to assist in maintaining each of the frame members 74, 75 and 76 in position, a tie rod or cable 77 is employed which is attached at one end to the hinge 89 and is attached at the other end to the margin of the top of the truck body opposite the hinge 92. In order to adjust the elevation of the frame members 74, 75 and 76 as desired a turnbuckle or the like 77a is provided in each of the tie members 77.

The cross sections of each of the frame members 74, 75 and 76 (and each of the sectional elements thereof) may be identical with the sectional views shown in Figs. 6, 5 and 4 respectively. Between the frame members 74 and 75 is a sheet 79 of flexible sheet material. The margins of the sheet 79 may be attached to the frame members 74 and 75 by means of the retaining track and fastening element means hereinabove described in connection with the embodiment shown in Figs. 1 to 10. According to the embodiment of Figs. 11 to 13 is it convenient to feed the fastening means attached to the margins of the sheet 79 successively into the retaining tracks therefor attached to the frame members from the ends of the frame members which are secured to the top of the truck. The sheet 79 in this way can be fed outwardly from the top of a truck and between the frame members 74 and 75 to the outermost extremities thereof. A similar sheet 80 of flexible sheet material is adapted to be fed similarly into position disposed between the frame members 75 and 76.

At the extremity of each of the frame members 74, 75 and 76 remote from the truck is a hook 81 on which spacer bar means 82 (either continuous or segmented) can be held in readily detachable relation in the manner above described with reference to the spacer bars 25 and 30. The extremities of the sheets 79 and 80 can be provided with hooks 83 for securement to the spacer bar 82. If desired one or more additional spacer bars (not shown) may be disposed at intermediate points in the longitudinal extent of the frame members to help support the sheets 79 and 80 and to provide greater strength. Also at the extremity of each of the frame members 74, 75 and 76 is a support bar 84 which is secured to each at its upper end and which is secured to the corresponding wing contour pad below each of the frame members 74, 75 and 76 as by use of the bolt 60 which passes through the channel bar 40 of the wing contour pad and the lower extremity of the bar 84.

The wing contour pads which are used in connection with the embodiment shown in Figs. 11 to 13 may be identical with the wing contour pads shown and described in connection with Figs. 3, 7, 8, 9 and 10. It is for this reason that the detail of the wing contour pad construction has not been shown in Figs. 11 and 12. Moreover, as previously described the wing contour pads may have the bar members 27, 28 and 29 secured thereto as shown and described in connection with the figures just referred to. As above described the hook 55 is provided at the end of each of the bar members 27, 28 and 29 for supporting the spacer bar 30.

While the wing contour pads may be secured to the upper and lower surfaces of the wing 21 as shown and described in connection with Figs. 3, 7, 8, 9 and 10 it is not essential that the wing contour pads be maintained in position along the upper and lower surfaces of the wing 21 in this way. Thus, if the clamping means for securing the wing contour pads to the upper and lower surfaces of the wing 21 are omitted the wing contour pad disposed along the upper surface of the airplane wing will remain in place especially when the contour pad for disposition along the under surface of the airplane wing is wrapped around into its desired position. In such case the lower wing contour pad can be prevented from falling away under the influence of gravity by the use of a support such as a post 85 which serves as a prop for holding the lower wing contour pad against the under surface of the airplane wing. If desired a jack or the like (not shown) can be placed underneath the lower end of the post 85 so that by manipulation of the jack the post 85 can be urged upwardly against the lower wing contour pad for pressing it against the under surface of the airplane wing.

In connection with the embodiment shown in Figs. 11 and 12 the side walls of the enclosure may be provided by curtains which extend from the truck body to the rearmost extremity of the enclosure. In Fig. 11 the curtain 86 is shown which, along the upper margin thereof, is provided with hooks so that it can be hung from the frame member 74. For this purpose the frame member 74 may be provided with eyes 70 as shown in Fig. 6 to which the hooks 69 secured to the curtain may be attached. The curtain 86 is cut out so as to permit the passage of the wing therethrough and the curtain margins which follow the contour of the wing may be attached to the wing contour pads by utilizing the eyes 71, 71a, 72 and 73 in essentially the same manner as illustrated in Fig. 3. In order to provide a wall for the rear of the enclosure a curtain 87 is provided having hooks 88 along the upper margin thereof for attachment to the spacer bar 82. This curtain is merely draped from the spacer bar 82 over the spacer bar 30 and then extends on down to the ground. The body of the vehicle 78 provides a front wall for the enclosure. This is frequently convenient, for if the vehicle body is provided with doors or other openings in the side thereof the workmen in the enclosure can have access to parts and tools in the vehicle body without going out of the enclosure. Moreover, the vehicle body may carry a suitable means for supplying heated air into the interior of the enclosure so as to make working conditions more comfortable in cold weather.

The convenience in use of the embodiment of this invention shown in Figs. 11, 12 and 13 is believed to be apparent. When an engine or other mechanism of an airplane needs servicing all that is necessary is to draw up the vehicle 78 in front of the engine. Conveniently the wing contour pads can be carried in the vehicle 78 along with such accessory parts as the spacer bars and curtains. All that is then required for providing an enclosure is to place the wing contour pads on the airplane wing at a spacing corresponding to the spacing of the frame members which are pivotally attached to the roof of the truck. These frame members are then unfolded to the position shown in Figs. 11 and 12 and their extremities supported by the posts 84 which are caused to be secured to the ends thereof and the corresponding wing contour pads. All that is required then for completing the enclosure is to draw the sheet material providing the roof into place between the frame members and to hang the curtains which provide the side and rear walls. The enclosure is then complete and provides protection for the workmen and for the airplane parts and tools. When the job has been completed then the sheet material constituting the roof and walls is removed, the wing contour pads removed and the frame members folded back on the roof of the truck as shown in Fig. 13.

While the enclosure has been illustrated in Figs. 11 and 12 as adapted for enclosing two engines mounted on a wing of an airplane it is apparent that the enclosure may be of smaller or larger size and in other locations relative to the wing of the airplane. Moreover, the embodiment shown in Figs. 11, 12 and 13 can be readily adapted for simultaneously servicing two airplanes as shown in Fig. 14. In Fig. 14 the enclosure shown in Figs. 11, 12 and 13 is shown as extending from the vehicle body 78 for enclosing engines mounted on the wing 21 of an airplane having the fuselage 20. By providing complementary frame members extending in the opposite direction from the vehicle 78 a second enclosure can be provided for engines mounted on the wing 21a of the airplane having the fuselage 20a.

Another manner of utilizing this invention is shown in Fig. 15. In Fig. 15 there is mounted on the wing 21 of the airplane 20 a servicing enclosure that may be essentially identical with that shown in Figs. 1 to 10 except for omission of the front curtain 38. Instead of utilizing the front curtain 38 a truck 78 which carries the type of servicing enclosure shown in Figs. 11, 12 and 13 is positioned in front of the servicing enclosure carried by the wing 21 so that elevation of the outermost extremities of the respective enclosures is about the same and so that the side curtains therefor will slightly overlap as illustrated in Fig. 15 by the overlapping of the side curtains 36 and 86 of the respective enclosures. In such case the outermost sections of each of the frame elements 74, 75 and 76 may be maintained in position as by use of a locking hinge 58a similar to the locking hinge 58 shown in Fig. 3, as illustrated in Fig. 15, between the sections 74c and 74d of the frame element 74. Alternatively, the outermost sections of the frame elements 74, 75 and 76 such as illustrated by the sections 74d in Fig. 15 could be omitted and the truck 78 could be brought into closer proximity to the wing 21 so as to bring the respective enclosures into the desired abutting relation.

While certain specific embodiments of this invention have been shown and described in detail, it is to be understood that this has been done for illustrative purposes.

I claim:

1. A readily installable servicing enclosure for a wing portion of an airplane which comprises in combination with a wing of an airplane at least two wing contour pads disposed transversely of said wing in substantially spaced relation along at least the upper surface of said wing, means for holding each of said wing contour pads in said position on said wing, elongated frame elements attached to each of said wing contour pads on the upper surface of said wing and having lateral extent projecting substantially beyond both the front and rear margins of said wing with a portion of each thereof in the region of one of said margins of said wing at a substantially greater elevation than the top of said wing, means for holding said frame elements in said projecting position, flexible sheet material disposed between said frame elements with opposed margins thereof adjacent said frame elements and secured thereto for providing a roof for the enclosure, and enclosing walls for the enclosure comprising side curtains attached to said frame elements and disposed substantially throughout their lateral extent with a portion thereof shaped to accommodate the passage of said wing therethrough.

2. A readily installable servicing enclosure according to claim 1 in which the flexible sheet material providing side wall protection underneath said wings on each side of the enclosure is secured along its upper margin to a wing contour pad maintained in position on the underside of said wing in substantial alignment respectively with said wing contour pads on the upper surface of said wing.

3. A readily installable servicing enclosure according to claim 1 in which the ends of said frame elements extending beyond one of the margins of said wing are secured to and supported by the roof of a truck body which constitutes one of the walls of the enclosure, and which comprises spacer bar means extending between and attached to the opposite ends of said frame elements extending beyond the other margin of said wing, and a curtain of flexible sheet material dependent from said spacer bar.

4. A readily installable servicing enclosure according to claim 1 which comprises spacer bar means extending between and attached to said frame elements adjacent each end thereof and curtains of flexible sheet material dependent therefrom.

5. A readily installable servicing enclosure for a wing portion of an airplane which comprises in combination with a wing of an airplane a first wing contour pad positioned transversely along at least the upper surface of said wing, a second wing contour pad positioned transversely along at least the upper surface of said wing in substantially spaced relation to said first wing contour pad, readily demountable means for maintaining said wing contour pads in said positions, first and second frame members extending from said first and second wing contour pads respectively and in substantial alignment therewith so as to project substantially beyond one of the margins of said wing with a portion thereof in the region of said margin at a substantially greater elevation than that of the top of said wing, readily demountable means for maintaining said first and second frame members in said positions extending from said wing contour pads, flexible sheet material extending between and attached to said frame members substantially throughout their length providing a roof for the enclosure, and enclosing walls for the enclosure comprising curtains of flexible sheet material dependent from said frame members and adapted to accommodate the passage of said wing therethrough.

6. A readily installable servicing enclosure according to claim 5 wherein the margins of said sheet material that provides the roof for the enclosure are secured to said frame members by fastening element means disposed along and attached to said margins of said sheet material and by a track member longitudinally disposed along and secured to each of said frame members, said fastening element means and track members being adapted for the retention of said fastening element means by said track members in slidable relation longitudinally along said frame members.

7. A readily installable servicing enclosure according to claim 5 which comprises means carried by said wing contour pads adapted to cooperate with means presented by said wing for securing said wing contour pads directly to the surface of said wing.

8. A readily installable servicing enclosure according to claim 5 wherein each of said wing contour pads which is disposed along the upper surface of said wing is connected to a wing contour pad disposed along the under surface of said wing by a connecting means which extends about the forward edge of said wing and which is adapted to be flexed to facilitate installation and removal of said wing contour pads, and means for holding said wing contour pads in said position disposed along the under surface of said wing.

9. In a readily installable servicing enclosure for a wing portion of an airplane, the combination comprising first and second elongated frame members laterally disposed in substantially parallel spaced relation at substantially the same elevation, means for maintaining said frame members in position disposed as aforesaid, a sheet of flexible weather resistant material disposed between said frame members, securing means for securing opposite margins of said flexible sheet material to said frame members in longitudinally slidable relation therewith for permitting the drawing of the margins of said sheet material longitudinally with respect to said frame members into position disposed therebetween in secured relation therewith, said securing means comprising fastening element means attached along said opposite margins of said flexible sheet material and retaining track means which is secured to each of said frame members and extends longitudinally therealong and which has an open end adjacent at least one end of each of said frame members adapted for the feeding of said fastening element means into said retaining track means in secured relation therewith and for the complete removal of said fastening element means and said flexible sheet material from secured relation with respect to said retaining track means and said frame members, and support means adjacent said open ends of said retaining track means for supporting said flexible sheet material in position unsecured to said frame members and adapted for the feeding of said fastening element means onto said retaining track means at said open ends thereof.

10. In a readily installable enclosure for a wing portion of an airplane the combination according to claim 9 wherein said fastening element means comprises a beaded edge disposed along and secured to opposite margins of said sheet material, the beaded edge along each margin of said sheet material being retained in slidable relation with said retaining track means secured to each of said frame members and extending longitudinally therealong.

11. A readily installable servicing enclosure for an engine mounted on a wing of an airplane which comprises in combination with said wing having said engine mounted thereon a first wing contour pad positioned transversely of said wing along both the upper and under surfaces of said wing on one side of said engine, a second wing contour pad positioned transversely of said wing along both the upper and under surfaces of said wing on the other side of said engine, means for maintaining said wing contour pads in said positions, first and second frame members extending from said wing contour pads on the upper surface of said wing substantially beyond the outermost extremity of said engine with the portion thereof in the region of said engine at an elevation substantially greater than that of the top of said engine, means for maintaining said first and second frame members in said position extending from said wing contour pads, flexible sheet material extending between said frame members substantially throughout their length providing a roof for the enclosure, and enclosing walls for the enclosure comprising curtains of flexible sheet material attached to said frame members and having a marginal portion which is shaped for the passage of said wing therethrough and which is secured to said wing contour pads on the upper and under surfaces of said wing.

12. A readily installable servicing enclosure according to claim 11 wherein said frame members are secured to said wing contour pads in readily detachable relation, wherein said frame members comprise a plurality of articulated sections adapted to be folded on each other for compact storage, and wherein said means for holding said wing contour pads in position are adapted to permit ready removal of said wing contour pads from said wing.

13. A readily installable servicing enclosure for an engine mounted on a wing of an airplane which comprises in combination with said wing having said engine mounted thereon a first wing contour pad positioned transversely along at least the upper portion of said wing on one side of said engine, a second wing contour pad positioned transversely along at least the upper surface of said wing on the other side of said engine, means for maintaining said wing contour pads in said positions, first and second frame members attached at one end to said first and second wing contour pads respectively and extending therefrom in substantial alignment therewith substantially beyond the outermost extremity of said engine with the portion thereof in the region of said engine at a substantially greater elevation than that of the top of said engine, means for maintaining said first and second frame members in said position extending from said wing contour pads, first and second bar members attached to said first and second wing contour pads and extending therefrom in substantial alignment therewith in the direction opposite to that of said frame members substantially beyond the wing edge thereunder, a spacer bar extending between and connected to the ends of said bar members, flexible sheet material disposed between said frame members and said bar members and from adjacent the extremity of said frame members to adjacent the extremities of said bar members, means attached to said frame members and to said bar members which coact with said flexible sheet material for holding said flexible sheet material in said position for providing a roof for the enclosure, and enclosing walls for the enclosure, said enclosing walls comprising curtains dependent from said frame members and from said bar members which are adapted to accommodate the passage of said wing therethrough, and a curtain dependent from said spacer bar.

14. A readily installable servicing enclosure according to claim 13 which comprises first and second lower wing contour pads disposed along the undersurface of the wings in substantial alignment with the wing contour pads disposed along the upper surface of the wing, wherein said curtains of flexible sheet material comprised in said enclosure walls have margins disposed adjacent and conforming to the upper and lower surfaces of the wing, and which comprises means for attaching said margins of said flexible sheet material to said wing contour pads disposed along the upper and under surfaces of said wing.

15. In a readily installable servicing enclosure for a wing portion of an airplane the combination comprising wing contour pads which are adapted for the connection of frame elements thereto and which are disposed and maintained transversely of a wing of an airplane in substantially spaced relation and frame elements connected to said wing contour pads adapted and maintained for carrying flexible sheet material to provide roof and walls for the enclosure, said wing contour pads comprising a plurality of clamping members which are adapted to be secured to members attached to said wing and which are adjustable relative to the length of said wing contour pads.

16. In a readily installable servicing enclosure for a wing portion of an airplane the combination comprising wing contour pads which are adapted for the connection of frame elements thereto and which are disposed and maintained transversely of a wing of an airplane in substantially spaced relation and frame elements connected to said wing contour pads adapted and maintained for carrying flexible sheet material to provide roof and walls for the enclosure, said wing contour pads comprising a first portion disposed along the upper surface of the wing, a second portion disposed along the under surface of said wing, a flexible strip connecting said portions and adjustably secured to at least one of them, and means for holding said first and second portions of said wing contour pads disposed as aforesaid.

17. A readily installable servicing enclosure for a wing portion of an airplane which comprises in combination with a wing of an airplane a first wing contour pad positioned transversely along at least the upper surface of said wing, a second wing contour pad positioned transversely along at least the upper surface of said wing in substantially spaced relation to said first wing contour pad, readily demountable means for securing said wing contour pads to said wing in said positions, first and second frame members extending from said first and second wing contour pads respectively and in substantial alignment therewith so as to project substantially beyond the forward margin of said wing with a portion of each in the region of said margin at a substantially greater elevation than the top of said wing, means coacting between said wing contour pads and said frame members for maintaining said frame members in position extended as aforesaid, flexible sheet material extending between and attached to said frame members substantially throughout their length providing a roof for the enclosure, and enclosing walls for the enclosure comprising curtains of flexible sheet material dependent from said frame members and adapted to accommodate the passage of said wing therethrough.

18. A readily installable servicing enclosure according to claim 17 which comprises adjacent the ends of said frame member remote from said wing contour pads bar means connected to and between said frame members for maintaining the spacing of said frame members and which comprises flexible sheet material dependent from said bar means for providing one of the walls of the enclosure.

19. A readily installable servicing enclosure for a wing portion of an airplane which comprises in combination with a wing of an airplane a first wing contour pad positioned transversely along at least the upper surface of said wing, a second wing contour pad positioned transversely along at least the upper surface of said wing in substantially spaced relation to said first wing contour pad, readily demountable means for holding said wing contour pads in said position, portable support means substantially spaced from the forward margin of said wing, first and second readily demountable frame members supported by and extending between said first and second wing contour pads respectively and said portable support means with the portions thereof in the region of said forward margin of said wing at an elevation substantially above that of the top of said wing, flexible sheet material extending between and attached to said frame members substantially throughout their length providing a roof for the enclosure, and enclosing walls for the enclosure comprising curtains of flexible sheet material dependent from said frame members and adapted to accommodate the passage of said wing therethrough.

20. A readily installable servicing enclosure according to claim 19 wherein said first and second frame members comprise a series of articulated sections adapted to be folded on one another upon detachment from said wing contour pads.

21. A readily installable servicing enclosure according to claim 19 wherein said support means consists of a vehicle adjacent the top of which one end of each of said frame members is secured, the body portion of the vehicle providing one of the walls of the enclosure.

22. A readily installable servicing enclosure for a wing portion of an airplane which comprises in combination with a wing of an airplane a first wing contour pad positioned transversely along at least the upper surface of said wing, a second wing contour pad positioned transversely along at least the upper surface of said wing in substantially spaced parallel relation to said first wing contour pad, readily demountable means for holding said wing contour pads in said positions, a vehicle, first and second frame members secured at one end thereof to said vehicle adjacent the top thereof in spaced relation corresponding to the spacing of said wing contour pads and extending outwardly from said vehicle in substantial alignment with said wing contour pads respectively so that a portion thereof is at a greater elevation than that of the top of said wing and the ends thereof remote from said vehicle are disposed over said wing contour pads, means adjacent the ends of said frame members remote from said vehicle for respectively securing same to said wing contour pads in readily detachable relation, flexible sheet material extending between and attached to said frame members substantially throughout their length providing a roof for the enclosure, enclosing walls for the enclosure comprising curtains of flexible sheet material dependent from said frame members and adapted to accommodate the passage of said wing therethrough and curtain means for providing the wall of the enclosure on the side thereof opposite to said vehicle.

23. A readily installable servicing enclosure according to claim 22 wherein said first and second frame members comprise a series of articulated sections adapted to be folded on one another upon detachment of said remote ends thereof from said wing contour pads so as to be carried by said vehicle.

24. In a readily installable servicing enclosure for a wing portion of an airplane the combination comprising first and second elongated frame members disposed in substantially parallel spaced relation at substantially the same elevation, said frame members being composed of a plurality of articulated sections adapted to be folded on each other for storage, a support, means for attaching each of said frame members adjacent one end thereof to said support, means for maintaining said frame members in position disposed as aforesaid with the said ends thereof secured to said support, opposed retaining track means attached to said frame members providing a track extending therealong when said frame members are in position disposed as aforesaid, said retaining track means having open ends adjacent said support, a sheet of flexible sheet material having fastening means disposed along and secured to opposite margins thereof adapted to be fed into said open ends of said retaining track means in retained relation thereto and to be advanced in sliding relation therewith for moving said sheet material into position between and marginally secured to said frame members, spacer bar means extending between said frame members adjacent the ends of said frame members remote from said support and means for securing another margin of said sheet of flexible sheet material to said spacer bar means.

25. In a readily installable servicing enclosure for a wing portion of an airplane the combination comprising wing contour pads which are adapted for the connection of frame elements thereto and which are disposed and maintained transversely of a wing of an airplane in substantially spaced relation, frame elements connected to said wing contour pads adapted and maintained for carrying flexible sheet material to provide roof and walls for the enclosure, means for attaching to at least one of said wing contour pads a portion of the margin of a sheet of flexible sheet material that provides a wall of the enclosure and means for attaching another portion of the margin of said sheet of flexible sheet material to a frame element connected to said wing contour pad.

26. In a readily installable servicing enclosure for a wing portion of an airplane, the combination comprising wing contour pads disposed transversely of a wing of an airplane in substantially spaced relation, means for maintaining said wing contour pads in position on said wing, each of said wing contour pads comprising longitudinally disposed substantially rigid bar means and each of said wing contour pads substantially conforming along the under surface thereof with the transverse peripheral contour of said wing, substantially rigid frame members extending outwardly from said wing contour pads and from said wing for carrying flexible sheet material to provide roof and walls for the enclosure, and means for holding said frame members disposed in said outwardly extending position, said last-named means comprising readily detachable securing means for securing said frame members to said bar means.

References Cited in the file of this patent

UNITED STATES PATENTS

| | | |
|---|---|---|
| 1,825,183 | Frisby | Sept. 29, 1931 |
| 1,877,984 | Schmidt | Sept. 20, 1932 |
| 2,358,446 | Couse | Sept. 19, 1944 |
| 2,453,403 | Bogardus | Nov. 9, 1948 |
| 2,526,389 | Montefalco | Oct. 17, 1950 |

FOREIGN PATENTS

| | | |
|---|---|---|
| 521,354 | Great Britain | May 20, 1940 |